United States Patent
Schrader et al.

(10) Patent No.: US 8,596,308 B2
(45) Date of Patent: Dec. 3, 2013

(54) METHOD AND APPARATUS FOR ASEPTIC FILLING OF FOOD PRODUCT

(75) Inventors: Gregory W. Schrader, Lakeland, FL (US); Manuele Levati, Parma (IT); Paul P. Brocker, Lakeland, FL (US)

(73) Assignee: John Bean Technologies Corporation, Chicago, IL (US)

( * ) Notice: Subject to any disclaimer, the term of this patent is extended or adjusted under 35 U.S.C. 154(b) by 334 days.

(21) Appl. No.: 12/941,155

(22) Filed: Nov. 8, 2010

(65) Prior Publication Data

US 2012/0111440 A1    May 10, 2012

(51) Int. Cl.
B65B 1/04    (2006.01)
A23L 2/42    (2006.01)

(52) U.S. Cl.
USPC ........ 141/11; 141/2; 141/64; 141/92; 141/94; 141/231; 141/387; 53/425; 53/426; 53/467; 426/399

(58) Field of Classification Search
USPC ........... 141/2, 4, 5, 11, 39, 85, 89–92, 70, 94, 141/231–232, 284, 329–330, 351–352, 141/387; 53/467, 471; 220/562, 1.5
See application file for complete search history.

(56) References Cited

U.S. PATENT DOCUMENTS

| | | | |
|---|---|---|---|
| 2,930,170 A | 3/1960 | Holsman et al. | 53/37 |
| 3,209,675 A | 10/1965 | Stimpson et al. | 99/269 |
| 3,340,671 A | 9/1967 | Loo | 53/37 |
| 3,356,510 A | 12/1967 | Barnby | 99/182 |
| 3,427,646 A | 2/1969 | Scholle | 53/281 |
| 3,453,839 A | 7/1969 | Sabin | |
| 3,514,919 A | 6/1970 | Ashton et al. | 53/21 |
| 3,917,867 A | 11/1975 | Atkins et al. | |
| 3,951,184 A | 4/1976 | Rechtsteiner et al. | 141/1 R |
| 3,971,491 A | 7/1976 | Mowatt-Larssen et al. | 220/71 |
| 4,047,547 A | 9/1977 | Rechtsteiner et al. | 141/1 |
| 4,120,134 A | 10/1978 | Scholle | 53/434 |
| 4,137,930 A | 2/1979 | Scholle | 137/68 R |
| 4,201,208 A | 5/1980 | Cambio, Jr. | 128/214.2 |
| 4,355,742 A | 10/1982 | Scholle | 222/490 |
| 4,445,550 A | 5/1984 | Davis et al. | 141/329 |

(Continued)

FOREIGN PATENT DOCUMENTS

| | | |
|---|---|---|
| WO | 2008027095 | 3/2008 |
| WO | 2010147672 | 12/2010 |

OTHER PUBLICATIONS

Hawaii Tank, "*Integrated Bulk Liquid-Food Logistics*", website: http://hawaiitank.com/, internet download Aug. 20, 2010, copyright 2010 Hawaii Intermodal Tank Transport.

(Continued)

*Primary Examiner* — Timothy L Maust
*Assistant Examiner* — Timothy P Kelly
(74) *Attorney, Agent, or Firm* — Allen, Dyer, Doppelt, Milbrath & Gilchrist, P.A.

(57) ABSTRACT

A method is for handling a sterilized food product and includes securing an aseptic fitment to a filling port of an intermodal container including a rigid shell having an elongate shape with opposed closed ends, and at least one frame assembly supporting the rigid shell. The method also includes sterilizing the intermodal container, and aseptically filling the sterilized intermodal container with the sterilized food product through the aseptic fitment. The method may also include sealing the aseptic fitment after aseptic filling. A related intermodal container and filling station are also disclosed.

18 Claims, 14 Drawing Sheets

(56) References Cited

U.S. PATENT DOCUMENTS

| | | | |
|---|---|---|---|
| 4,494,363 A | 1/1985 | Rica et al. | 53/426 |
| 4,597,422 A * | 7/1986 | Kovacevich, Jr. | 141/85 |
| 4,667,603 A | 5/1987 | Van Iperen | |
| 4,805,378 A | 2/1989 | Anderson | 53/426 |
| 4,875,811 A | 10/1989 | Merrett et al. | 406/39 |
| 5,851,068 A | 12/1998 | Rumph | 366/348 |
| 5,881,780 A * | 3/1999 | Matye et al. | 141/232 |
| 5,975,642 A | 11/1999 | Dibble et al. | 298/17 |
| 6,030,580 A | 2/2000 | Raasch et al. | 422/40 |
| 6,070,622 A | 6/2000 | Rutter | |
| 6,277,328 B1 | 8/2001 | Raasch et al. | 422/40 |
| 6,453,680 B1 | 9/2002 | Allen | 62/45.1 |
| 6,722,403 B2 | 4/2004 | Zhou et al. | |
| 6,966,741 B2 | 11/2005 | Gay et al. | 414/662 |
| 7,039,530 B2 | 5/2006 | Bailey et al. | |
| 7,479,877 B2 | 1/2009 | Mortenson et al. | |
| 7,798,379 B2 | 9/2010 | Johnson et al. | 222/563 |
| 2005/0260309 A1 | 11/2005 | Hagemyer et al. | 426/330 |
| 2008/0053992 A1 | 3/2008 | DeBord | 220/1.6 |
| 2008/0067855 A1 | 3/2008 | Morten | |
| 2009/0134171 A1 | 5/2009 | Deberardinis | 220/562 |
| 2009/0257853 A1 | 10/2009 | Marston et al. | 414/425 |

OTHER PUBLICATIONS

Hawaii Tank, Intermodal Tank, *"Integrated Bulk Liquid-Food Logistics"*, website: http://hawaiitank.com/products/specs/intermodal-tank/, internet download Aug. 20, 2010, copyright 2010 Hawaii Intermodal Tank Transport.

Hawaii Tank, Intermodal Tank, *"Integrated Bulk Liquid-Food Logistics"*, website: http://hawaiitank.com/products/intermodal-tanks/ , internet download Aug. 20, 2010, copyright 2010 Hawaii Intermodal Tank Transport.

JBT FoodTech, *"Aseptic Bag Filling Systems Bulk Packaging"*, website: http://jbtfoodtech.com/solutions/equipment/aseptic-fillers/aseptic-bag-fillers.aspx , internet download Oct. 1, 2010, JBT Corporation.

JBT FoodTech, "The *Aseptic Filling Process"*, website: http://jbtfoodtech.com/solutions/equipment/aseptic-fillers/how.aspx , internet download Oct. 1, 2010, JBT Corporation.

* cited by examiner

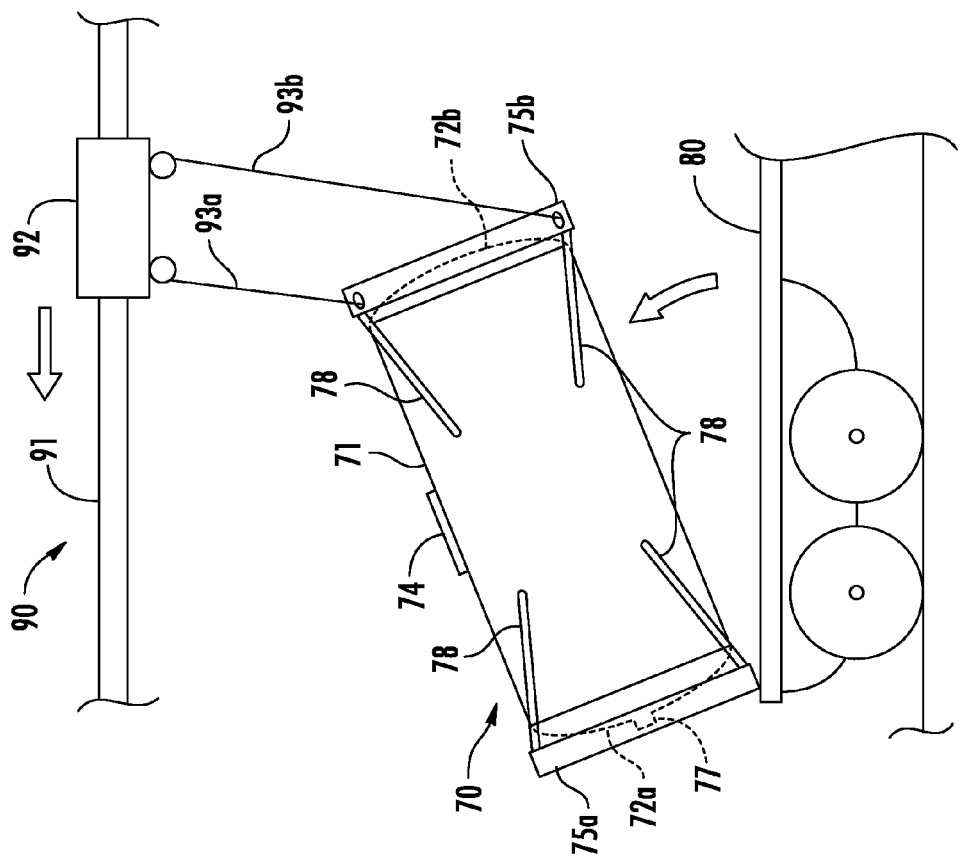
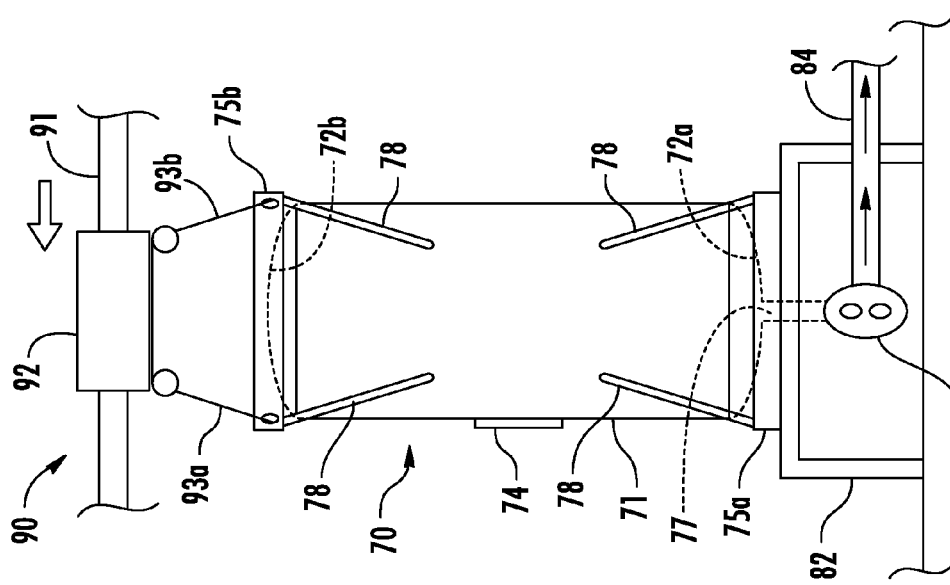

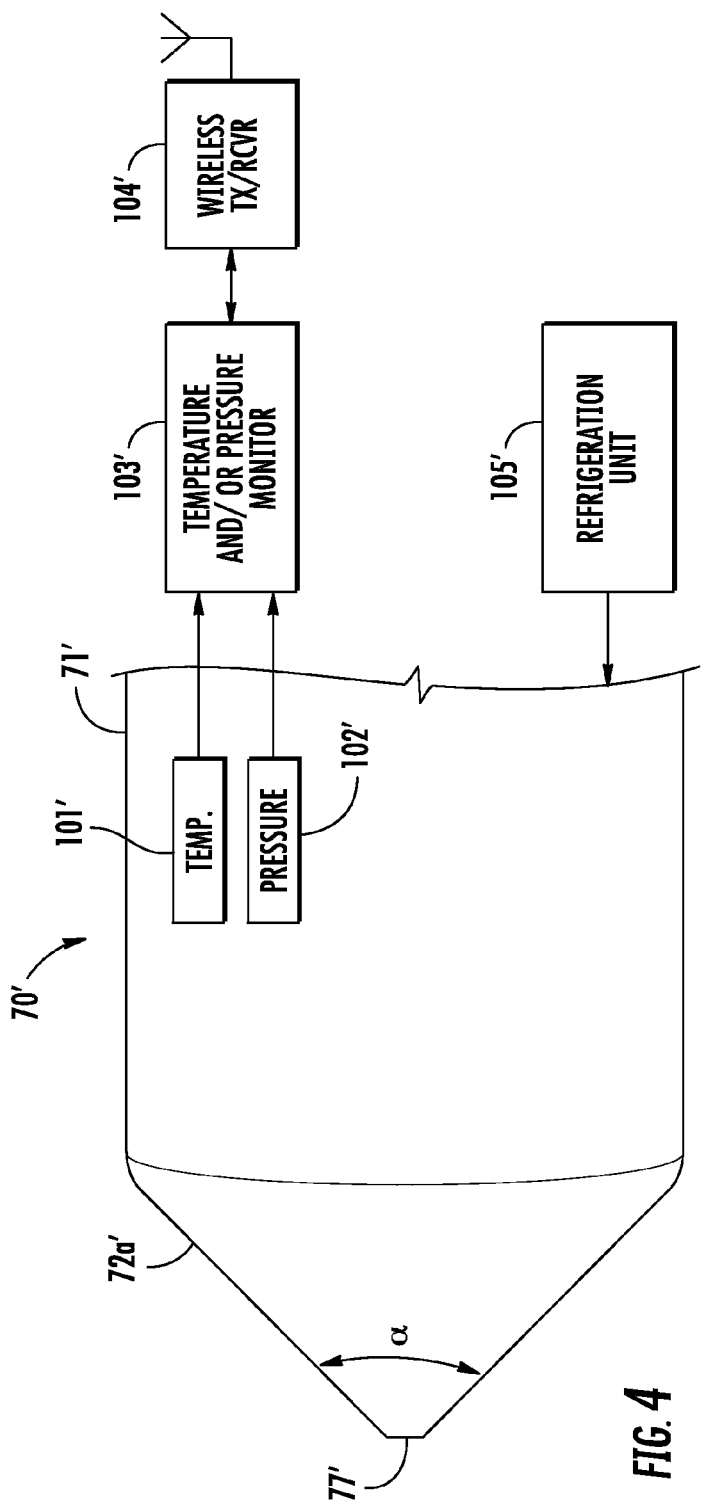
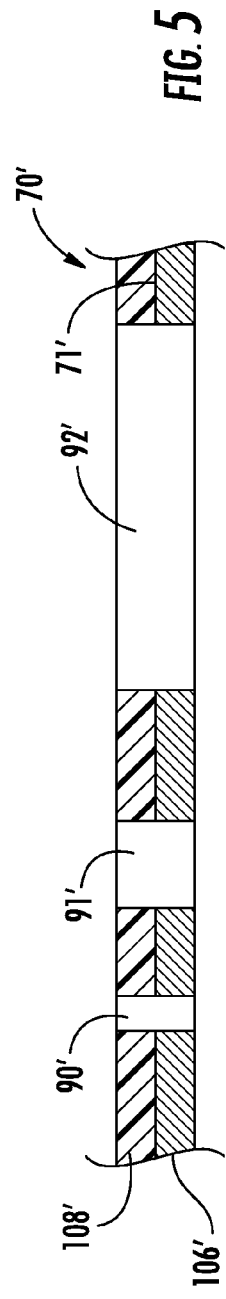
FIG. 4
FIG. 5

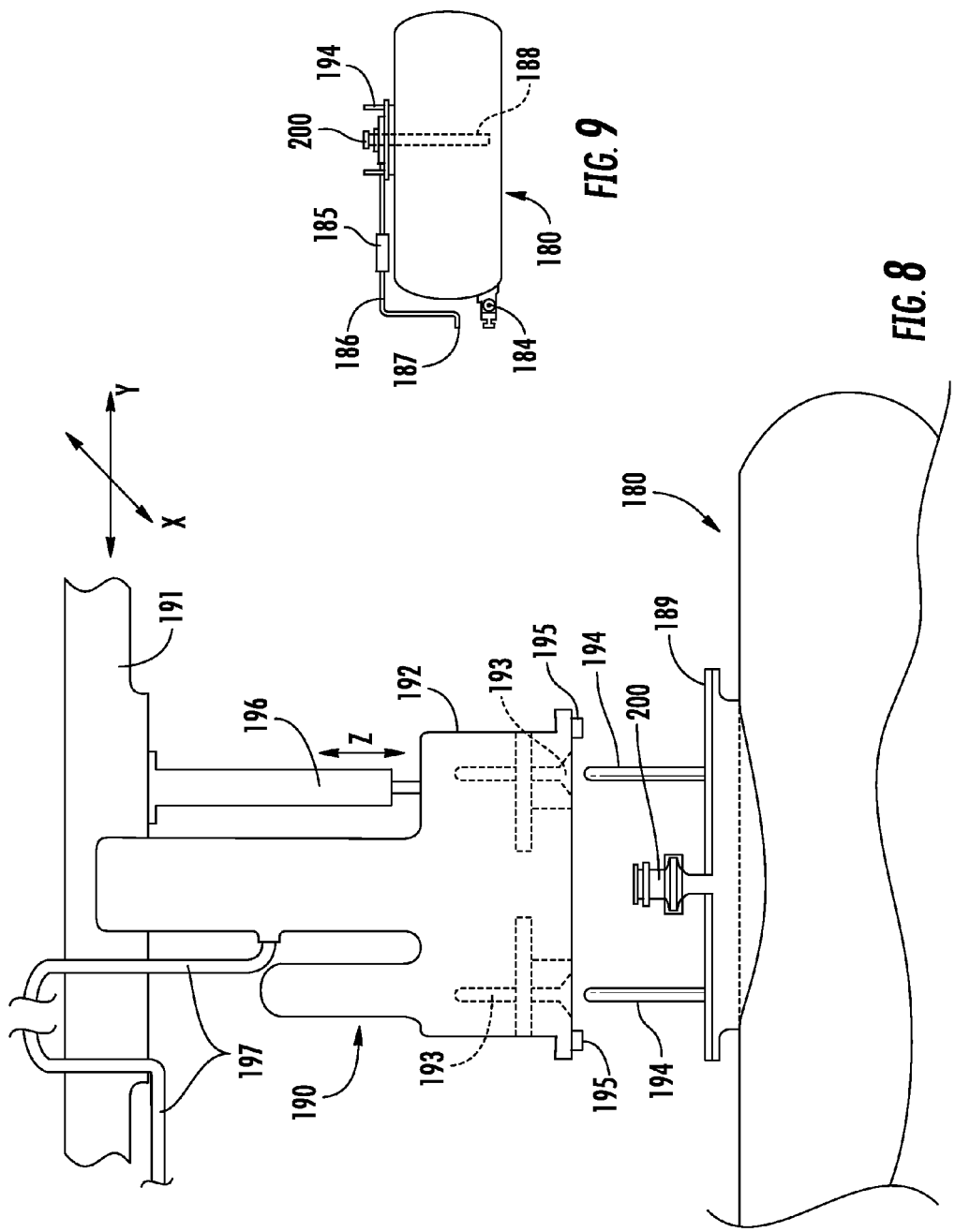

METHOD AND APPARATUS FOR ASEPTIC FILLING OF FOOD PRODUCT

FIELD OF THE INVENTION

The present invention relates to the field of food science, and, more particularly, to the area of aseptically handling food products.

BACKGROUND OF THE INVENTION

In the field of food processing, it is common to process food at one location and transport bulk quantities to another location for further processing or final packaging. Various methods have been developed for containing and transporting food products. For example, fruit juice or milk is often processed at one facility and sent to another facility for final packaging. The two facilities may be located in close proximity to each other or may be in different countries. Because food products are susceptible to degradation due to microbial spoilage, various processing methods are used to retard or prevent the growth of microorganisms during this transportation and storage. These include sterilizing the food product inside a container, hot-filling a clean container, or putting the sterile food product into a sterile container. Other methods include freezing, refrigeration or the use of preservatives.

Disadvantages of sterilizing inside a container include the expense of such a container and the food product degradation due to the amount of heat required. Also, because of the need to sterilize the cold point of the food product, this type of processing is common for final packaging, but not typically done for bulk products. Bulk food product is food product in a quantity that is much larger than that in the final retail or food service package. Bulk food product is typically more than 50 gallons, for example. Likewise, hot filling is typically used for final packaging, but not for bulk products.

In contrast, freezing is a typical method for processing bulk products for transportation. For example, pasteurized fruit juices are often filled into 55 gallon drums, often with a drum liner, and then frozen prior to shipping. Disadvantages of freezing include the energy required for freezing, the energy required to keep the product frozen during the transportation and storage cycle, and the cost of the drums. Additional disadvantages include the potential physical and chemical changes of the product due to freezing. For example, when citrus pulp cells are frozen, the cell walls are disrupted. Upon thawing, the pulp cells have different physical characteristics than pulp cells that have not been frozen.

There are many disadvantages to the use of chemical preservatives for certain food products. These include consumer perception and changes in flavor. In many food products, the use of preservatives is not allowed under standard of identity or by law.

For certain food products, the method of putting a sterile food product into a sterile container has many advantages over the above mentioned processes. This method is typically referred to as aseptic processing. In aseptic processing, a food product is pasteurized to a point where it is considered commercially sterile. In such a state, there is a very low probability of the presence or growth of microorganisms. The sterilized food product is then placed into a sterile container in such as way as to avoid the introduction of microorganisms. Aseptic processing can be used to put sterilized food product into the final consumer container (for example, shelf stable milk or juice) or can be used to store and transport bulk food products in an aseptic state. For example, juices and tomato products are often pasteurized and aseptically filled into 300 gallon bags for storage and transportation to other food processing facilities. Likewise, juices may be pasteurized and aseptically filled into large permanent bulk containers (currently up to two million gallons) for storage prior to blending and packaging.

The most common form of aseptic food product transportation includes the use of 300 gallon bags as mentioned above. Such a bag is filled within a disposable or re-usable container such as a wooden box, or re-usable plastic container, and the bag is sealed with a cap after filling. The wooden or plastic container supports the bag and allows for the boxes to be stacked during transportation. Citrus pulp is currently aseptically filled into such "bag-in-the-box" containers. While widely used, the disadvantages of this method include the cost of the bags and the boxes. When shipped overseas, the return of empty boxes for further use incurs additional cost. An additional disadvantage of such a system is that the bags cannot be aseptically unloaded. At the point of use, the bags are cut open and the product is dumped or pumped out of the bags. It is therefore necessary to further pasteurize the product prior to final packaging.

Another method of aseptic transportation involves the use of aseptic tankers or rail cars and over-the-road containers. The rail cars typically had cone shaped hoppers on the bottom. This method was used by Bishopric Products Co. (formerly of Cincinnati, Ohio) to transport tomato product (Food Technology, July 1976). Tankers were sterilized through the use of steam or chemical sterilant (iodophor, for example) and then filled with sterile product. Such food product was kept under pressure with sterile gas during transportation and was successfully transported in an aseptic state from one site to another.

For example, U.S. Pat. No. 3,209,675 discloses an apparatus for the aseptic transportation of perishable liquids. The apparatus described is a transportable container, sterilized by a chemical sterilant (peracetic acid) and kept pressurized during transportation by the use of a cylinder of inert gas. U.S. Pat. Nos. 6,030,580 and 6,277,328 also disclose a method of aseptically transporting bulk food product in a transportable container. The use of aseptic tankers or rail cars as described in these patents overcomes the cost of bags and boxes and provides for a more economical method of transporting aseptic product.

Hawaii Intermodal Tank Transport LLC, of Palmetto, Fla., supplies aseptic intermodal containers for the aseptic transportation of food product. Such intermodal containers use the same principles as mentioned above for aseptic tankers and rail cars, but provide the additional advantage of being configurable to be transportable by truck, rail or ship. Juice is currently being aseptically transported in such intermodal containers.

With reference to FIG. 1, such an intermodal container 30 includes a cylindrically shaped rigid shell 31 that may be approximately 20 feet long, and that may hold approximately 24,000 liters. The shell includes rear and front closed ends 32a, 32b in the form of shallow domes. A discharge port is positioned behind a rear panel access door 33 at the bottom of the rear closed end 32a. The intermodal container 30 also includes a pair of rear and front rectangular support frame assemblies 35a, 35b that support the rigid shell and permit stacking of the containers, such as for transportation via ship, or when in a storage area, for example. The container 30 may also include inwardly extending corner support arms, not shown, that extend inwardly from the corners of the respective support frame assemblies 35a, 35b and attach to the rigid shell 31. The intermodal container 30 also illustratively includes a ladder 36 carried by the rear support frame assembly 35a, and a horizontal walking platform 37 to facilitate access to the manway and other ports on the top of the rigid shell 31. The intermodal container 30 in some configurations may include an insulation layer associated with the rigid shell 31. In addition, a portable refrigeration unit may be provided to keep the contents cold, and one or more temperature and/or pressure sensors may be provided to monitor the contents.

While providing a safe and economical method to aseptically transport liquid food products, the use of aseptic tankers, rail cars and intermodal containers does not lend itself to the aseptic transportation of high viscosity products, such as, for example, tomato paste, high viscosity fruit purees or citrus pulp. High viscosity food products may be considered as food products that do not readily flow by gravity. These products, if placed into a typical tank with a free-draining bottom will not flow out of the tank or will flow at such a slow speed that gravity draining is impractical. Such products may be pumpable with the correct pump selection and can thus be pumped into an aseptic container. However, because these products do not readily flow by gravity, it is not easy to remove such high viscosity food products from such a container.

An intermodal container typically also includes an aseptic filling/discharge valve that is used to both fill and discharge the food product. When switching from one container to another, a hose is disconnected from one container and connected to another. Since the hose is disconnected and exposed to the atmosphere, the aseptic condition is lost. Therefore, the hose is re-sterilized when connected to the next container. In addition, an outer chamber of the filling valve is also sterilized before passing sterile food product through the valve. This sterilization process may require a substantial amount of time between containers. Since it is a manually intensive process, it may be susceptible to user-error which could result in product contamination. Such aseptic filling of tanks and containers is disclosed, for example, in U.S. Pat. Nos. 3,951,184 and 4,047,547, the entire disclosures of which are incorporated herein by reference in their entireties.

U.S. Pat. No. 3,209,675, for example, discloses an apparatus for the aseptic transportation of perishable liquids. The apparatus described is a transportable container, sterilized by a chemical sterilant (peracetic acid) and kept pressurized during transportation by use of a cylinder of inert gas. U.S. Pat. Nos. 6,030,580 and 6,277,328 both describe the aseptic transportation of food product with a chemical sterilant.

Juice and other liquid food products are currently being aseptically transported in intermodal containers by Hawaii Intermodal Tank Transport. The intermodal containers can be transported by truck, rail or ship, and they are filled and discharged through a single valve located on the low point of the tank. Re-sterilization of the filling line is required between each container.

SUMMARY OF THE INVENTION

In view of the foregoing background, an object of the present invention is to provide an aseptic filling method for the efficient aseptic filling of an intermodal container.

This and other objects, features and advantages in accordance with the present invention are provided by a method for handling a sterilized food product comprising securing an aseptic fitment to a filling port of an intermodal container comprising a rigid shell having an elongate shape with opposed closed ends, and at least one frame assembly supporting the rigid shell. The method also includes sterilizing the intermodal container, and aseptically filling the sterilized intermodal container with the sterilized food product through the aseptic fitment. The method may also include sealing the aseptic fitment after aseptic filling. Accordingly, large bulk quantities of sterilized food product may be aseptically transported, without additional sterilization and/or pasteurization steps.

Aseptically filling may comprise aseptically filling the intermodal container using a moveable aseptic filling head being moveable in at least an x-y plane. The intermodal container may be maintained in a fixed position during aseptic filling, and filling may comprise aligning the moveable aseptic filling head relative to the intermodal container. Aligning the moveable aseptic filling head may be performed based upon at least one of optical, mechanical and electrical sensing.

In some embodiments, the aseptic fitment comprises a membrane-type aseptic fitment, and the moveable aseptic filling head is compatible with the membrane-type aseptic fitment. In other embodiments, the aseptic fitment comprises a cap-type aseptic fitment, and the moveable aseptic filling head is compatible with the cap-type aseptic fitment. The method may further comprise supplying a sterile gas to maintain a positive pressure within the intermodal container during aseptic filling.

In some embodiments, the sterilized food product may comprise a viscous sterilized food product having an absolute viscosity of greater than 500 centipoise, such as sterilized citrus pulp. In other embodiments, the sterilized food product may comprise sterilized fruit or vegetable juice, for example.

The intermodal container may have a capacity greater than 10,000 liters. The method may further include transporting the intermodal container after aseptic filling. The method may also include maintaining at least one of a desired pressure and desired temperature within the intermodal container during transporting. The method may include recording at least one of the desired pressure and desired temperature, and wireless transmitting the data. The sterilizing may be performed using at least one of steam and a chemical sterilant.

Another aspect of the invention relates to an intermodal container for handling a sterilized food product. The intermodal container may comprise a rigid shell having an elongate shape with opposed closed ends and at least one frame assembly supporting the rigid shell. The rigid shell may also have a filling port therein. In addition, the intermodal container may also include an aseptic fitment secured to the filling port for permitting aseptic filling of the intermodal container with the sterilized food product. In some embodiments, the aseptic fitment may comprise a membrane-type aseptic fitment, and in other embodiments, the aseptic fitment may comprise a cap-type aseptic fitment.

The intermodal container may further comprise at least one alignment feature associated with the aseptic fitment to facilitate alignment of a moveable aseptic filler head into engagement with the aseptic fitment. The at least one alignment feature may comprise at least one of an optical, mechanical and electrical sensing feature, for example.

The rigid shell may have a capacity greater than 10,000 liters. The rigid shell may have a gas port therein to receive a flow of sterile gas to maintain a positive pressure within the rigid shell.

The at least one frame assembly may comprise respective first and second rectangular frames connected to respective ones of the opposed closed ends. The intermodal container may also include a thermal insulation layer adjacent the rigid shell. In some embodiments, a refrigeration unit may be coupled to the rigid shell.

The intermodal container may also include at least one of a temperature sensor and a pressure sensor associated with the rigid shell. A data recorder may be provided to record at least one of the temperature and pressure. A wireless transmitter may wirelessly transmit at least one of the temperature and pressure.

Yet another aspect of the invention relates to an aseptic filling station for aseptically filling an intermodal container through an aseptic fitment of the intermodal container with a sterilized food product. The aseptic filling station may include a sterilized food product source, and a moveable aseptic filling head coupled to the sterilized food product source and being moveable in at least an x-y plane. The aseptic filling station may further comprise at least one of an optical, mechanical and electrical sensing device coupled to the moveable aseptic filling head to facilitate alignment thereof.

In some embodiments, the aseptic fitment comprises a membrane-type aseptic fitment. In these embodiments, the moveable aseptic filling head is compatible with the membrane-type aseptic fitment. In other embodiments, the aseptic fitment comprises a cap-type aseptic fitment, and the moveable aseptic filling head is compatible with the cap-type aseptic fitment.

The sterilized food product source may comprise a sterilized food product source of a viscous sterilized food product having an absolute viscosity of greater than 500 centipoise, such as citrus pulp. In other embodiments, the sterilized food product source may comprise a sterilized fruit or vegetable juice source, for example.

BRIEF DESCRIPTION OF THE DRAWINGS

FIGS. 3A and 3B are schematic side elevational views illustrating rotating and emptying, respectively, in accordance with the method of FIG. 2.

FIG. 4 is a schematic view of a portion of another embodiment of an intermodal container in accordance with the present invention.

FIG. 5 is a greatly enlarged portion of the rigid shell of the intermodal container as shown in FIG. 4.

FIG. 8 is a more detailed schematic side view of a portion of another embodiment of an aseptic filling station and intermodal container in accordance with the present invention.

FIG. 9 is a more detailed schematic side view of the intermodal container as shown in FIG. 8.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in alternative embodiments.

Figure 2:
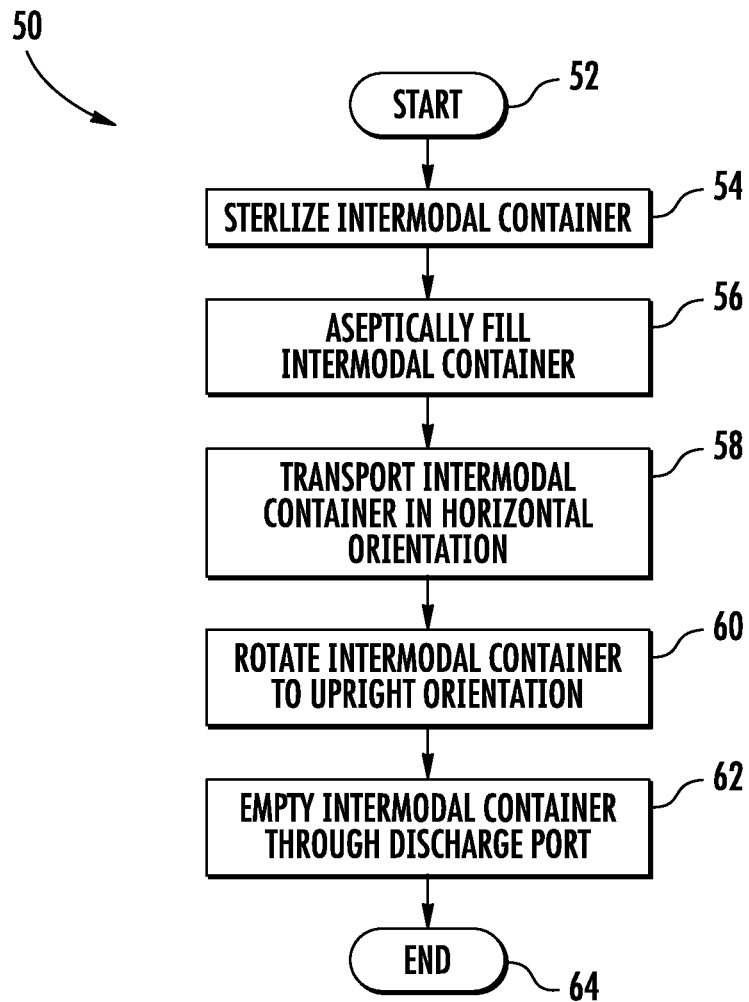
FIG. 2 is a flowchart of a method of handling a sterile food product in accordance with the invention.

Referring initially to the flowchart 50 of FIG. 2, a method for handling a sterilized food product is now described. After the start (Block 52), the method includes sterilizing an intermodal container (Block 54) comprising a rigid shell having an elongate shape with opposed closed ends and a discharge port in one of the closed ends. The sterilizing may comprise sterilizing the interior of the intermodal container using at least one of steam and a chemical sterilant.

In some embodiments, the intermodal container may be of the conventional type described above and offered by Hawaii Intermodal; however, in other embodiments, the intermodal container may be of the advantageous types as described below. The intermodal container may include at least one support frame assembly supporting the rigid shell and configured to permit rotation between a generally horizontal orientation and a generally upright orientation.

The generally upright orientation may be at an angle greater than 40° from horizontal, and the generally horizontal orientation may be less than 40° from horizontal. Of course, oftentimes it may be that the intermodal container is transported in a nearly exact horizontal orientation, and that the intermodal container is emptied in a fully upright or vertical orientation as will be appreciated by those skilled in the art.

The method also includes aseptically filling the intermodal container with the sterilized food product at Block 56. At Block 58 the method also includes transporting the filled intermodal container in the generally horizontal orientation via at least one of rail, truck, and ship and while maintaining the sterilized food product in aseptic conditions. At the desired emptying destination, the method includes at Block 60 rotating the intermodal container to the generally upright orientation, and emptying the sterilized food product from the discharge port (Block 62) before stopping at Block 64. The method advantageously permits a bulk quantity of sterilized food product to be efficiently transported and emptied from the intermodal container using the advantage of gravity-based emptying. The emptying may also be carried out aseptically as will be appreciated by those skilled in the art.

The method is particularly useful for such emptying when the sterilized food product comprises a viscous sterilized food product, such as citrus pulp, for example, or other food product having an absolute viscosity of greater than 500 centipoise. Attempting to pump such a viscous food product in a conventional fashion from a conventional intermodal container in the horizontal orientation may take a relatively long time and/or leave an undesirably large amount of food product within the container as will be appreciated by those skilled in the art.

With additional reference to FIGS. 3A and 3B, the rotating and emptying are further described. In particular, rotating is illustratively achieved by engaging the forward support frame assembly 75b with a lifting device in the form of an overhead crane 90 including an overhead horizontal support member 91, a movable crane trolley 92 carried by the support member, and lifting cables 93a, 93b extending from the crane trolley. The intermodal container 70 may include suitable fittings or openings to facilitate the temporary attachment of the lifting cables 93a, 93b. Of course in other embodiments, the intermodal container 70 may be grasped and manipulated using other types of moving equipment.

The intermodal container 70 is illustratively lifted from the truck bed 80 (FIG. 3A), rotated, and the rear support frame assembly 75a is placed upon an emptying stand 82 (FIG. 3B). A pump 83 is coupled in fluid communication with the discharge port 77 typically via an aseptic valve, not shown, secured to the rigid shell 71 at the discharge port. In other embodiments, gravity feeding alone may be sufficient so that the pump 83 is not needed, or the pump need not be placed immediately below the rigid shell 71.

Figure 1:
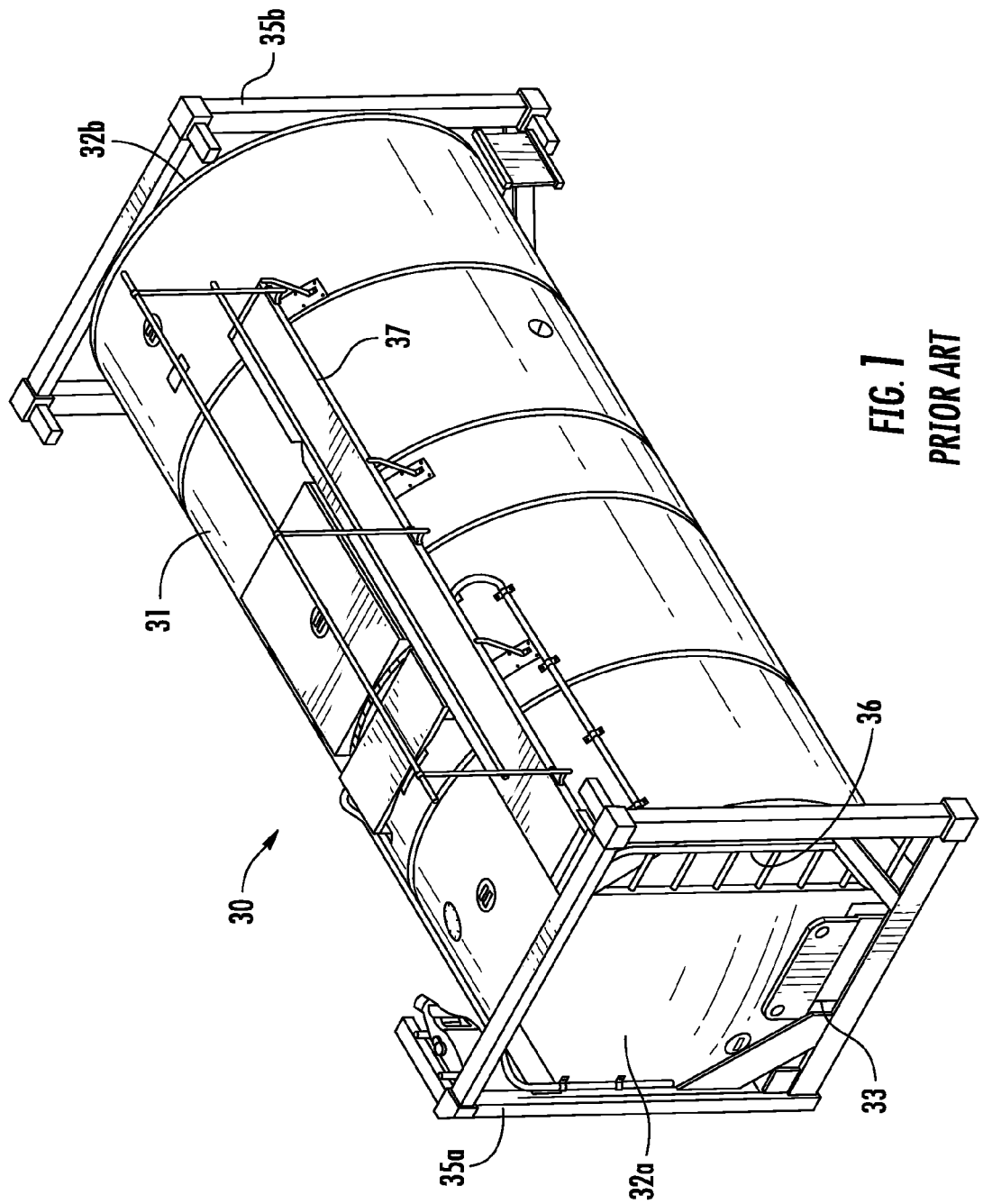
FIG. 1 is a perspective view of an intermodal container as in the prior art.

In typical embodiments, the intermodal container may have a capacity greater than 10,000 liters, and typically about 24,000 liters, for example. Unlike a conventional intermodal container 30 as shown in FIG. 1 wherein the discharge port is at the lower periphery of the rear closed end, the discharge port 77 of the intermodal container 70 is illustratively positioned in a medial portion of the rear closed end 72a of the rigid shell 71. The intermodal container 70 also illustratively includes a manway cover 74 and the rigid shell 71 includes a domed shaped forward or front closed end 72b. Corner support struts 78 also illustratively extend from the respective support frame assemblies 75a, 75b to corresponding attachment areas along the outside of the rigid shell 71.

As will be appreciated by those skilled in the art, the method may also include supplying a sterile gas to maintain a positive pressure within the intermodal container 70, such as during transporting or storage, and also during emptying, as the positive pressure helps maintain the aseptic conditions for the sterile food product and may help in emptying the rigid shell 71. Additionally, the method may further include maintaining at least one of a desired pressure and desired temperature within the intermodal container 70 during transporting. The desired pressure and/or desired temperature may be recorded or wirelessly transmitted.

Referring now additionally to FIGS. 4 and 5, another embodiment of an intermodal container 70' is now described. In this embodiment, the rear closed end 72a' of the rigid shell 71', having the discharge port therein 77', has a conical shape, and the discharge port is positioned at the apex of the conical shape. The conical shape may define an included angle α greater than 45° and less than 90°, for example. In other embodiments, the discharge port 77' may be offset from an axis of the cylindrical shell 71'. In these offset embodiments, it might not be necessary to rotate the intermodal container to the full upright position as will be appreciated by those skilled in the art.

The intermodal container 70' also illustratively includes a temperature sensor 101' and a pressure sensor 102' coupled to or positioned within the rigid shell 71'. A data recorder in the form of a temperature and/or pressure monitor 103' is coupled to the sensors 101', 102'. This monitor 103' can include electronic circuitry carried by the rigid shell 71' or carried by one of the support frame assemblies, for example. The monitor 103' can be manually read as desired, or, as shown in the illustrated embodiment, the data stored by the monitor may be wirelessly downloaded via the wireless transceiver 104' as will be appreciated by those skilled in the art. The data may be exceedance data or just periodically sampled data, for example.

In the embodiments where it is desired to keep the sterilized food product at a temperature lower than ambient, a refrigeration unit 105' may be coupled to the rigid shell 71'. The refrigeration unit 105' may be carried by one of the support frame assemblies or by the rigid shell 71'.

With particular reference to FIG. 5, the rigid shell 71' may comprise a stainless steel layer 106'. In addition, an insulating layer 108' may surround the stainless steel layer 106'. The rigid shell 71' also illustratively includes a gas port 90' for permitting a flow of sterile gas to maintain a positive pressure within the rigid shell 71', such as during transporting and/or emptying. The gas port 90' may alternatively be positioned in the forward or front closed end 75b' in other embodiments.

The rigid shell 71' further has a sterilized food product filling port 91' therein, and a manway port 92' therein. The gas port 90' may include a suitable fitting coupled thereto, not shown, for external connection. The food product filling port 91' may also include a suitable fitment, not shown, coupled to the port. And the manway port 92' may have a suitable manway hatch, not shown, associated therewith. Other configurations of ports are also possible as will be appreciated by those skilled in the art.

Figure 6:
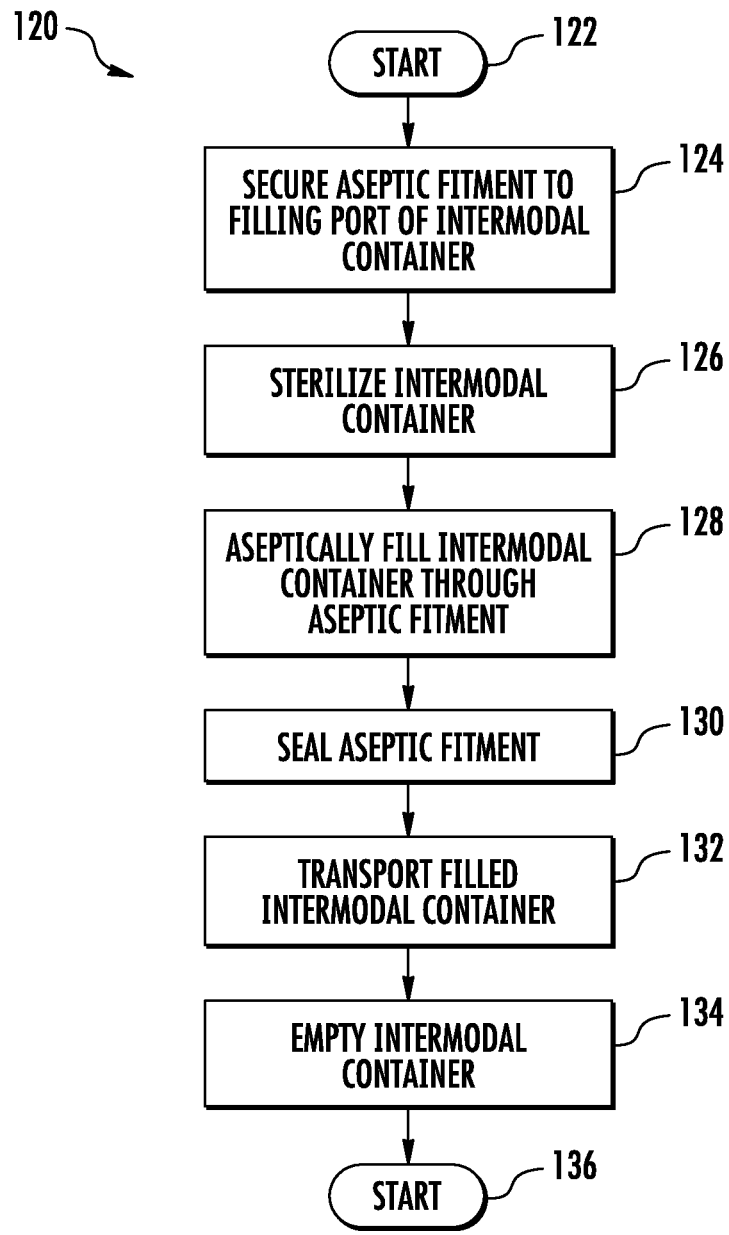
FIG. 6 is a flowchart for another method of handling a sterile food product in accordance with the invention.

Another aspect relates to a method for aseptically filling the intermodal container 70'. Referring to the flowchart 120 of FIG. 6, the filling method is now described. After the start (Block 122), the method includes securing an aseptic fitment to the filling port of the intermodal container (Block 124). The aseptic fitment is not a conventional aseptic valve as will be appreciated by those skilled in the art.

The intermodal container 70' may be of the type described above, although the placement of the discharge port in a medial portion of the rear closed end is not necessary to these embodiments directed to filling. Of course, the discharge port placement, conically shaped closed end, and aseptic fitment as now described may be advantageously used in combinations or all together in some embodiments.

The method also includes sterilizing the intermodal container (Block 126) and aseptically filling the sterilized intermodal container with the sterilized food product through the aseptic fitment at Block 128. At Block 130 the method also includes sealing the aseptic fitment after aseptic filling. The filled intermodal container 70' may be transported (Block 132) before emptying (Block 134) and before stopping at Block 136.

As already explained, after aseptic filling the method may also include maintaining at least one of a desired pressure and desired temperature within the intermodal container during transporting. The method may include recording at least one of the desired pressure and desired temperature, and wirelessly transmitting the data. The sterilizing may be performed using at least one of steam and a chemical sterilant. Accordingly, the method permits large bulk quantities of sterilized food product to be aseptically transported, and without additional sterilization and/or pasteurization steps.

Figure 7:
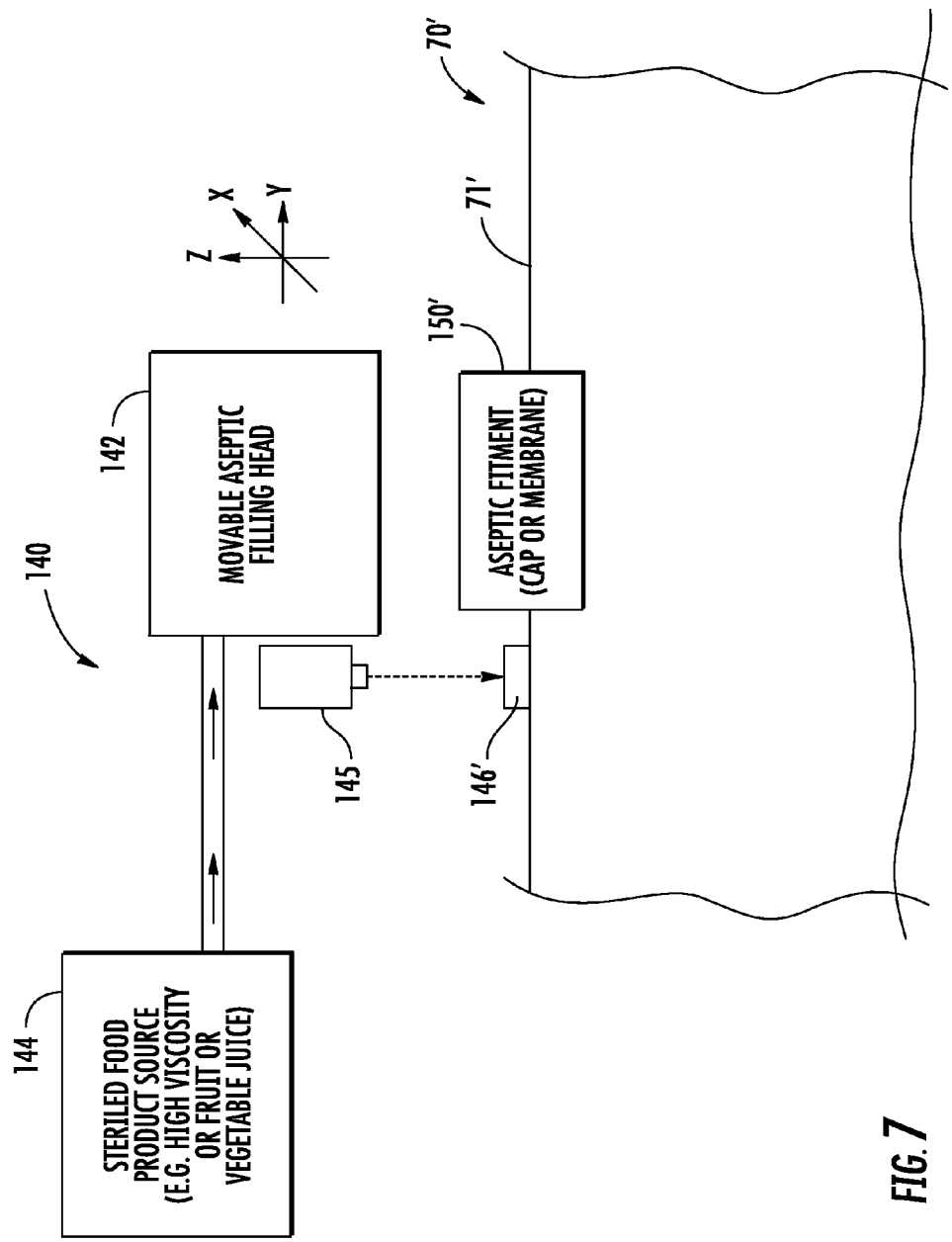
FIG. 7 is a schematic diagram of an aseptic filling station and intermodal container for use in accordance with the method of FIG. 6.
Figure 10:
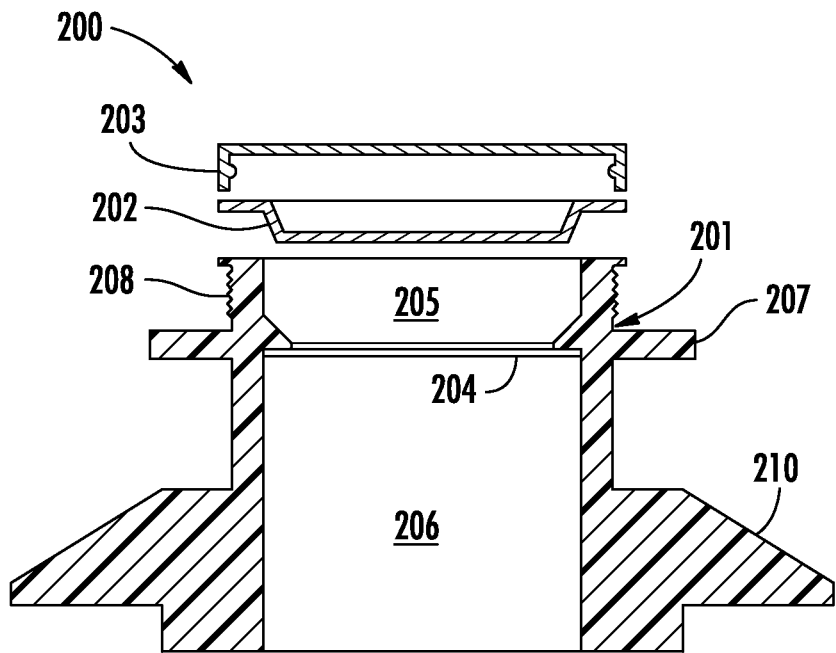
FIG. 10 is a cross-sectional view of a membrane-type aseptic fitment for use on the intermodal container in accordance with the present invention.

Turning now additionally to FIG. 7 further features of the aseptic filling method, the intermodal container 70' and the associated filling station 140 are now described. The aseptically filling is illustratively carried out using a moveable aseptic filling head 142 that is part of an aseptic filling station 140 that also includes a sterilized food source 144 coupled to the moveable filling head. A typical aseptic filling station for the flexible bag containers as described in the background above relies upon an operator to manually attach the bag to the filler head. Such a bag filler is unsuitable for the intermodal container and associated methods. Accordingly, the filling station 140 in accordance with this aspect includes a moveable filling head 142 that is moveable in at least an x-y plane. Movement in the z-direction is also advantageously provided. A frame, not shown, may mount the moveable aseptic filling head 142 and various associated positioning actuators, not shown, as will be appreciated by those skilled in the art.

Of course, the relatively large intermodal container 70' will typically be maintained in a fixed position during aseptic filling, such as when positioned on the bed of a truck. Accordingly, filling comprises aligning the moveable aseptic filling head 142 relative to the intermodal container 70', since the intermodal container is stationary.

To facilitate aligning the moveable aseptic filling head 142 relative to the rigid shell 70' and the aseptic fitment 150', the filling head may have coupled thereto at least one sensor 145. The sensor 145 may operate based upon at least one of optical, mechanical and electrical sensing. For example, the sensor 145 may be a camera. Of course other configurations and types of sensors may be used. In addition, the intermodal container 70' may include at least one alignment feature 146' adjacent the aseptic fitment 150'. For example, the alignment feature 146' may comprise an optically viewable pattern of indicia, mechanically sensed ridges or patterns, or capacitive or inductive components for electrical sensing as will be appreciate by those skilled in the art. In some embodiments, no alignment feature may be needed on the rigid shell 70', such as for optical sensing using a camera, for example.

The truck carrying the intermodal container 70' may be positioned within a range of possible motion of the moveable filler head 142, and, thereafter, the moveable filler head 142 may guide itself into precise engagement with the aseptic fitment 150', or may be guided with the assistance of an operator.

In some embodiments, the aseptic fitment 150' comprises a membrane-type aseptic fitment, and the moveable aseptic filling head 142 is compatible with the membrane-type aseptic fitment. In other embodiments, the aseptic fitment 150' comprises a cap-type aseptic fitment, and the moveable aseptic filling head 142 is compatible with the cap-type aseptic fitment. The method may further comprise supplying a sterile gas to maintain a positive pressure within the intermodal container 70' during aseptic filling. The sterile gas may be introduced through the gas port 90' (FIG. 5).

The sterilized food source 144 may contain a viscous sterilized food product having an absolute viscosity of greater than 500 centipoise, such as sterilized citrus pulp. In other embodiments, the sterilized food product may comprise sterilized fruit or vegetable juice, or other fluid food product as will be appreciated by those skilled in the art.

Other aspects and features of the intermodal container 70' have already been described with respect to transporting and emptying, and these same features are also advantageous for aseptically filling and transporting. For example, the optional refrigeration, insulation, and data logging may also be used after aseptic filling through the aseptic fitment 150' as will be appreciated by those skilled in the art.

The conventional filling approaches typically require the re-sterilization of the feed pipe and hoses during every filling cycle. These approaches are time consuming and susceptible to possible contamination.

An aseptic filling head for the bag containers is known in the art. For example, U.S. Pat. Nos. 4,445,550 and 4,805,378 each discloses such an aseptic filling head and each is incorporated herein by reference in its entirety.

An aseptic fitment with a frangible membrane (rupture disk) is described in U.S. Pat. No. 4,494,363, incorporated herein by reference in its entirety, and assigned to FranRica Mfg. Inc. This type of fitment is currently made by companies such as Scholle Corporation of North Lake, Ill. under the model designations 1700 and 5100. An aseptic fitment with a plastic cap is disclosed in U.S. Pat. Nos. 4,355,742 and 4,120,134 each incorporated herein by reference in its entirety. Scholle Corporation also makes the cap-type fitments under the model designations 800X, 800L and 2600. Other prior art packaging material and filling apparatus are disclosed U.S. Pat. Nos. 3,514,919; 2,930,170; 3,340,671; 3,356,510; 3,427,646; 4,137,930; and 4,201,208 each incorporated herein by reference in its entirety.

Bag-in-box (300 gallon) containers and other packaging materials as disclosed above are currently being filled with aseptic filling heads. However, these are flexible bag containers with limited capacity and that are also not pressurized. In these systems, the filling head is fixed in the x-y plane and the fitment of the flexible container is moved to mate with the filling head. Over the road tankers and intermodal containers are currently being filled through a common filling/discharge valve. Unfortunately, sterilization of the valve and filling hose is required between each tanker. The methods, intermodal containers and filling station described herein overcome these and other deficiencies of the prior art approaches.

For a membrane-type fitment, during filling the moveable aseptic filling head 142 is aligned and sealed against the aseptic filling fitment 150'. The external surfaces of the aseptic fitment and filling head are then sterilized by steam or chemical sterilant. The rupture membrane is broken by the filling head and sterile food product is introduced into the intermodal container 70'. A sterile cap is sealed over the fitment while still under sterile conditions, and the aseptic filling head 142 is removed from the aseptic fitment 150'. For a cap-type fitment the cap is first removed, then replaced after filling.

Further aspects of the embodiments described herein are now described with additional reference to FIGS. 8 and 9. The intermodal container 180 is fitted with a manway cover 189 that includes various fittings. These fittings include a membrane-type aseptic fitment 200 and a pair of alignment rods 194 for aligning with the aseptic filling head 190. Other fittings, not shown, may include fittings for cleaning, tank access and the introduction of sterile gas as will be appreciated by those skilled in the art.

The aseptic filling head 190 includes a movable frame 191 that allows the aseptic filling chamber 192 to move in the x-y plane to align with the aseptic fitment 200. The aseptic filling chamber 192 includes alignment features in the form of alignment rod receiving recesses 193 cooperating with the alignment rods 194 for aligning the filling head 190 with respect to the manway cover 189, and, hence, with respect to the aseptic fitment 200. Contact and/or proximity sensors 195 are also provided for sensing when the filling chamber 192 is in the correct upright position relative to the intermodal container 180. The filling chamber 192 may be one of many types available in the industry, such as those made by JBT Corporation or Scholle Corporation. The aseptic filling head 190 also illustratively includes an actuator 196 for upright movement (i.e. along the z-axis) and a flexible hose 197 for the transport of the food product.

Other parts of the intermodal container 180 include a product discharge valve 184, and a gas line 186 having an inlet 187 for introducing sterile gas into the container through a sterile gas filter cartridge 185 as shown in FIG. 9. An upright filling tube 188 is connected to fill port of the intermodal container 180. This optional filling tube 188 allows for the filling of certain liquids into the bottom of the intermodal container 180 to minimize or reduce splashing or foaming during the filling operation.

Referring now additionally to FIGS. 10-14 the membrane-style aseptic filling fitment 200 is further described. The fitment 200 includes an aseptic fitment body 201, a sealing disc 202, and a screw cap 203. The fitment body 201 is preferably molded of a suitable plastic material, such as high-density polyethylene. The fitment body 201 receives a frangible membrane or diaphragm 204 to extend across the filling opening 205. The membrane 204 is sufficiently strong to withstand a pressure of 15-30 psi, for example, to which the membrane may be exposed during sterilization of the lower neck opening 206 when mounted on the intermodal container 180.

Figure 13:
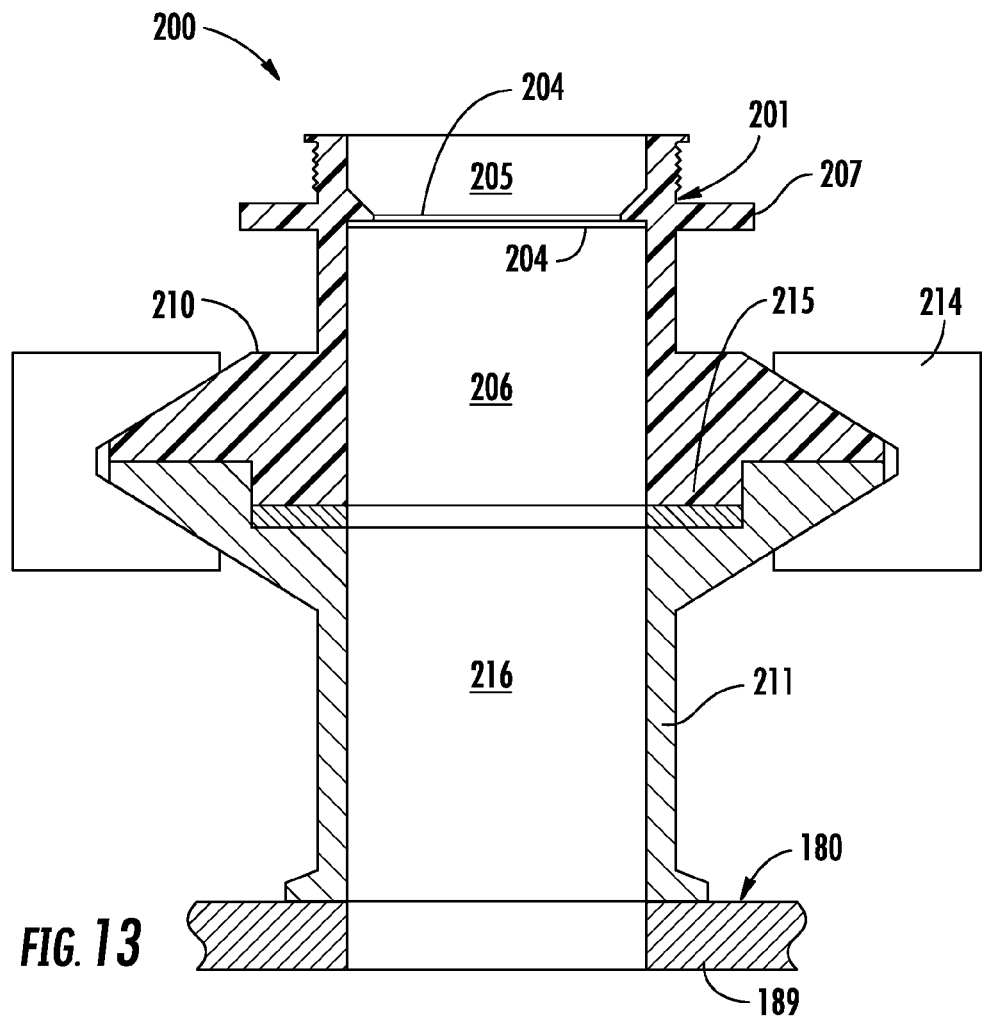
FIG. 13 is a cross-sectional view of the membrane-type aseptic fitment as shown in FIG. 10 mounted on an intermodal container.

The fitment body 201 also includes a clamping flange 207 to accommodate the clamping jaws of the filling head 190, a threaded neck 208 adapted to receive the screw cap 203, and a beveled clamping shoulder 210 for clamping onto a receiving tank ferrule 211 (FIG. 13). The beveled clamping shoulder 210 is, for example, of a style known as an I-line fitting. Other aseptic connections such as DIN 11864-2 aseptic flange unions or DIN 11-864-1 aseptic screwed unions could also be used to mount the filling fitment 200 onto the intermodal container.

Figure 11:
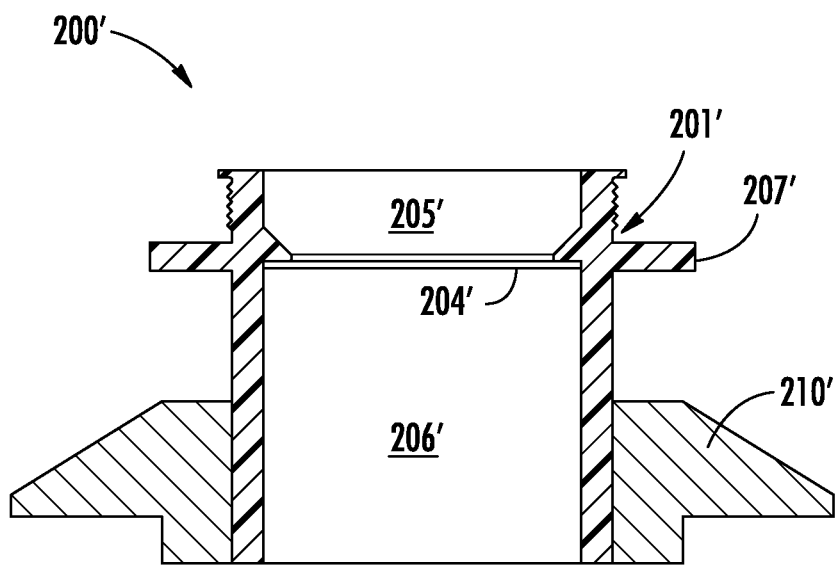
FIG. 11 is a cross-sectional view of another embodiment of the membrane-type aseptic fitment as shown in FIG. 10.

An alternative embodiment of the membrane-type aseptic fitment 200' is shown in FIG. 11 and includes a fitment body 201' molded of a suitable plastic material and a separate beveled clamping shoulder 210' preferably made of stainless steel. The two parts are bonded together through either melting of the molded plastic fitment body 201' or through the use of a suitable bonding agent.

Figure 12A:
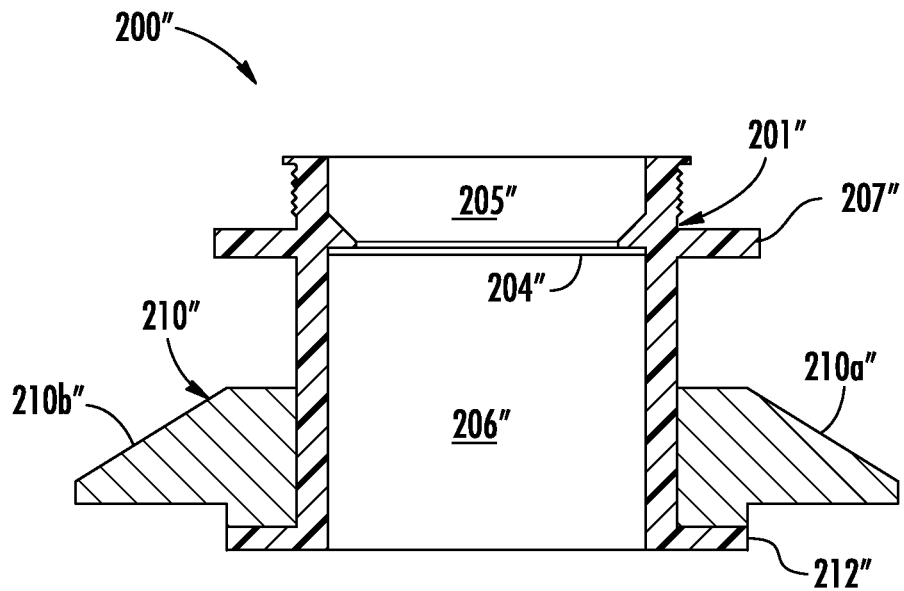
FIG. 12A is a cross-sectional view of yet another embodiment of the membrane-type aseptic fitment as shown in FIG. 10.
Figure 12B:
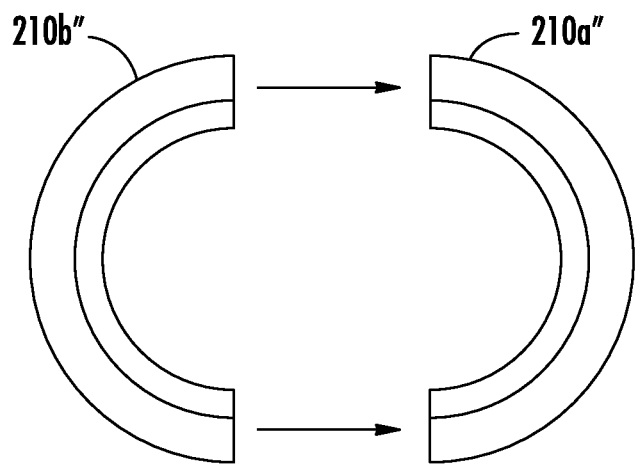
FIG. 12B is a plan view of the shoulder portions of the membrane-type aseptic fitment as shown in FIG. 12A.

Another alternative embodiment of the membrane-type aseptic fitment 200" is now described with specific reference to FIGS. 12A and 12B. In this embodiment, the filling fitment 200" includes a filling fitment body 201" molded of a suitable plastic material and a separate, two-piece beveled clamping shoulder 210" preferably of stainless steel. The two-part clamping shoulder 210" comprises a left-hand shoulder portion 210a" and a right-hand shoulder portion 210b" which are assembled onto the fitment body 201" during assembly onto the intermodal container 180. The fitment body 201" also includes a lower shoulder 212" for sealing against a gasket 215 (FIG. 13) during assembly onto the intermodal container 180.

The membrane-type aseptic fitment 200 as assembled onto the intermodal container 180 is further described with more specific reference to FIG. 13. The receiving ferrule 211 is preferably a stainless steel ferrule, such as a female I-line ferrule welded onto the manway cover 189. A gasket 215 of suitable material, such as Viton rubber, is located between the fitment body 201 and the mating ferrule 211 and is sealed in place through the use of a clamp 214, such as an I-line clamp. The internal space 216 within the neck of the receiving ferrule 211, the gasket 215 and the lower filling opening 206 of the fitment body 201 can all be sterilized along with the internal portion of the intermodal container 180 by steam or chemical sterilization as will be appreciated by those skilled in the art. The upper fill opening 205 of the fitment 200 along with the top surface of the membrane 205 are sterilized by the aseptic filling head 190 prior to rupturing of the membrane 204 during filling.

Figure 14:
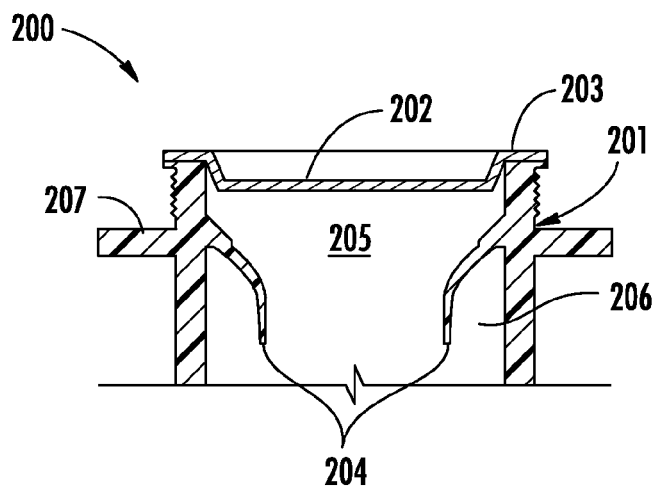
FIG. 14 is a cross-sectional view of the membrane-type aseptic fitment as shown in FIG. 10 after rupturing of the membrane.

As best shown in FIG. 14, after the completion of the filling operation, the membrane 204 has been ruptured, and the sealing disc 202 has been sealed onto the fitment body 201 and secured by the cap 203. The sealing disc 202 is preferably formed of a multilayer material including a layer of low density polyethylene and a layer of aluminum foil which are adhesively bonded together. After filling, the disc 202 is sealed to the fitment body 201 by heat, for example.

Figure 15:
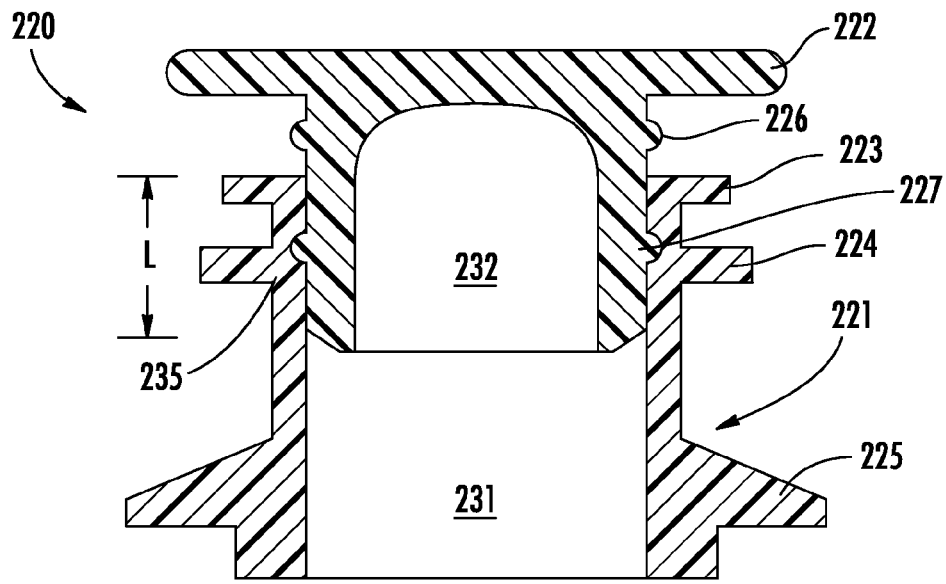
FIG. 15 is a cross-sectional view of a cap-type aseptic fitment for use on the intermodal container in accordance with the present invention.

Turning now to FIGS. 15-18, a cap-style aseptic fitment 220 for use on the intermodal container 180 is now described. The aseptic fitment 220 includes a fitment body 221, and a sealing cap 222. The fitment body 221 is preferably molded of a suitable plastic material, such as high-density polyethylene. The fitment body 221 includes an upper clamping flange 223 and a lower clamping flange 224 to accommodate the clamping jaws of the filling head, and a beveled clamping shoulder 225 for clamping onto a receiving tank ferrule 211. The beveled clamping shoulder 225 is, for example, of a style known as an I-line fitting. The sealing cap 222 includes an upper contact ring 226 and a lower contact ring 227 for sealing with the fitment body 221. Prior to filling as shown in FIG. 15, for example, the cap 222 has been partially pushed into the fitment body 221 so that the lower contact ring 227 is in sealing contact with a corresponding recess in the fitment body.

Figure 16:
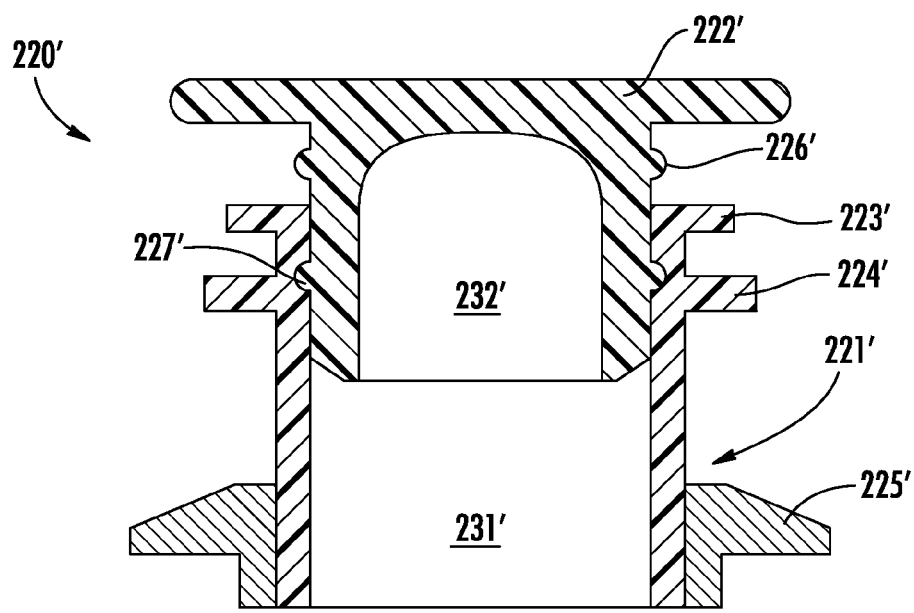
FIG. 16 is a cross-sectional view of another embodiment of the cap-type aseptic fitment as shown in FIG. 15.

An alternative embodiment of the cap-type aseptic fitment 220' is shown in FIG. 16. In this embodiment, the filling fitment 220' includes the filling fitment body 221' molded of a suitable plastic material, and a separate beveled clamping shoulder 225' at the base of the body and preferably made of stainless steel, for example. The two parts 221', 225' are bonded together through either melting of the molded plastic fitment body 221' or through the use of a suitable bonding agent.

Figure 17A:
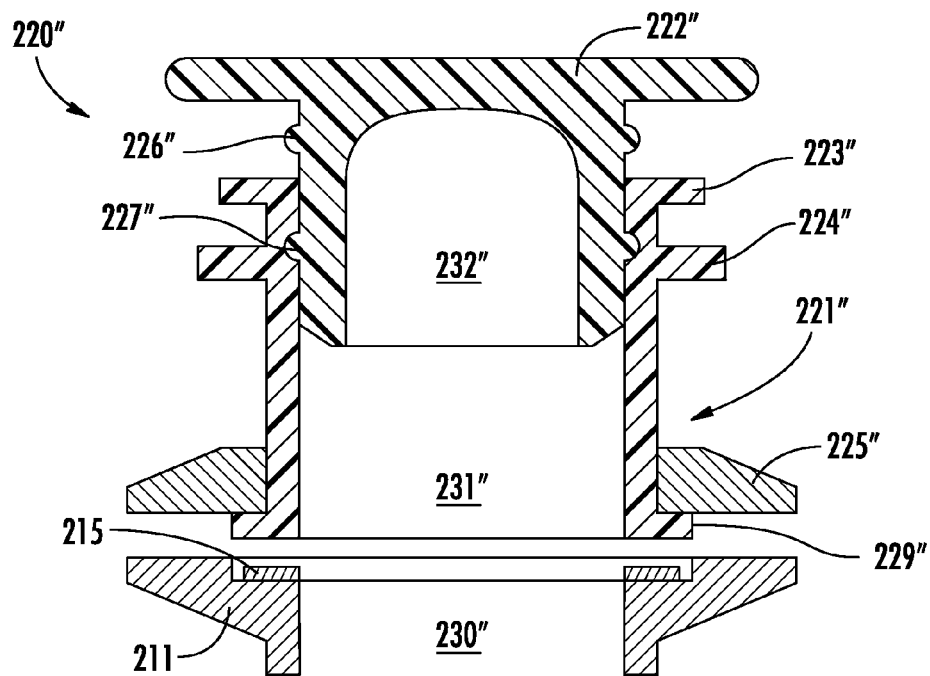
FIG. 17A is a cross-sectional view of yet another embodiment of the cap-type aseptic fitment as shown in FIG. 15.
Figure 17B:
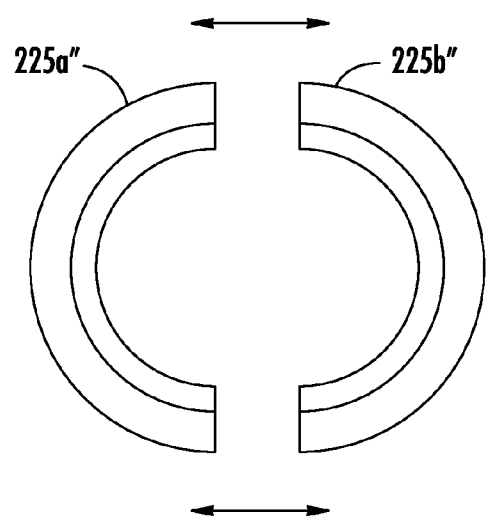
FIG. 17B is a plan view of the shoulder portions of the cap-type aseptic fitment as shown in FIG. 17A.

Another alternative embodiment of the cap-type aseptic filling fitment 220" is shown in FIGS. 17A and 17B. The fitment 220" in this embodiment includes the filling fitment body 221" molded of a suitable plastic material and a separate, two-piece beveled clamping shoulder 225" preferably of stainless steel. The two-part clamping shoulder 225" includes a left-hand shoulder portion 225a" and a right-hand shoulder portion 225b" which are assembled onto the fitment body 221" during assembly onto the intermodal container 180. The fitment body 221" also includes a lower shoulder 229" for sealing against a gasket 215 during assembly onto the container 180 (FIG. 18).

Figure 18:
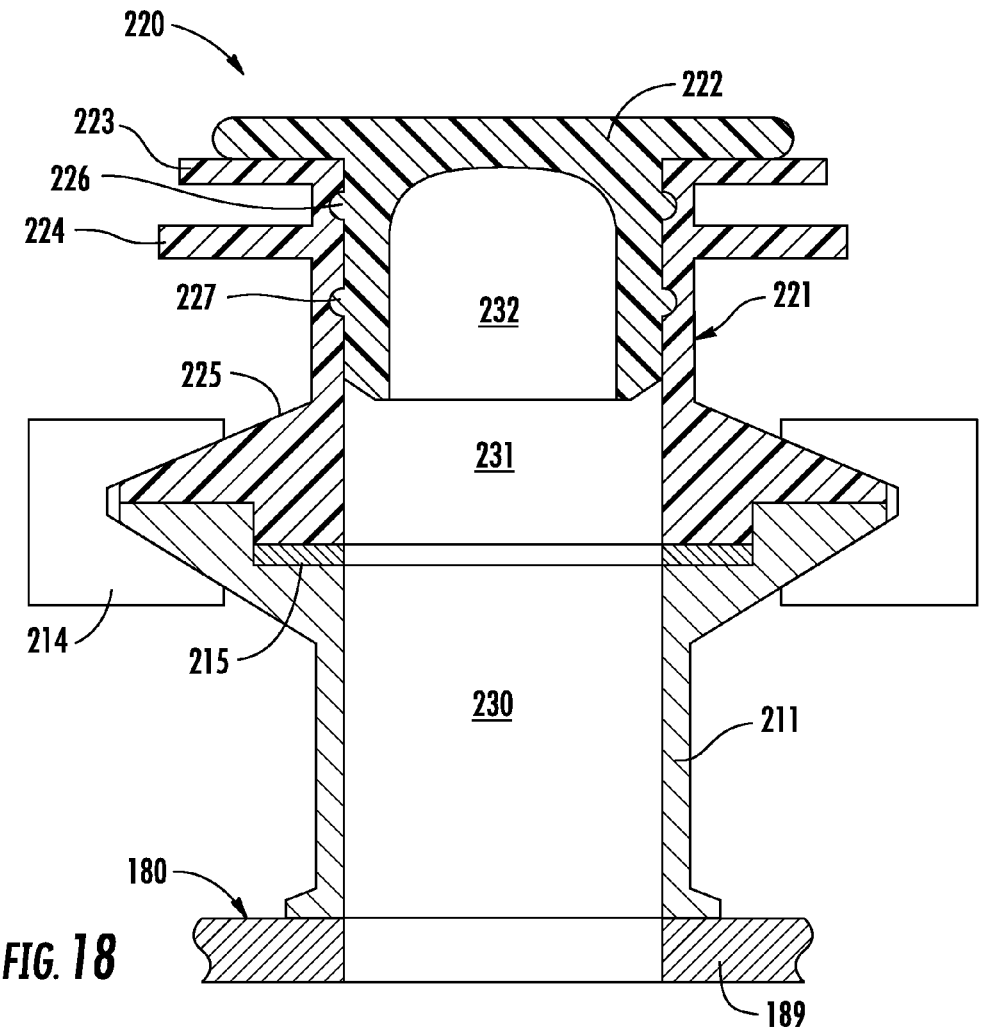
FIG. 18 is a cross-sectional view of the cap-type aseptic fitment as shown in FIG. 15 mounted on an intermodal container.

The cap-type aseptic fitment 220 is assembled onto the intermodal container 180 at a receiving ferrule 211 that is connected to the manway cover 189 of the intermodal container 180 as shown in FIG. 18. The receiving ferrule 211 may preferably be a stainless steel ferrule, such as a female I-line ferrule welded onto the manway cover 189. A gasket 215 of suitable material, such as Viton rubber, is located between the lower end of the fitment body 221 and the mating receiving ferrule 211, and is sealed in place through the use of a clamp 214, such as an I-line clamp. As will be appreciated by those skilled in the art, the internal neck area 230 of the receiving ferrule 211, the gasket 215, the lower filling opening 231 of the fitment body 221, and the internal cap cavity 232 can be sterilized along with the internal part of the intermodal container 180 by steam or chemical sterilization. The outer surface of the cap 222 is sterilized by the aseptic filling head prior to removing the cap during filling.

Figure 19:
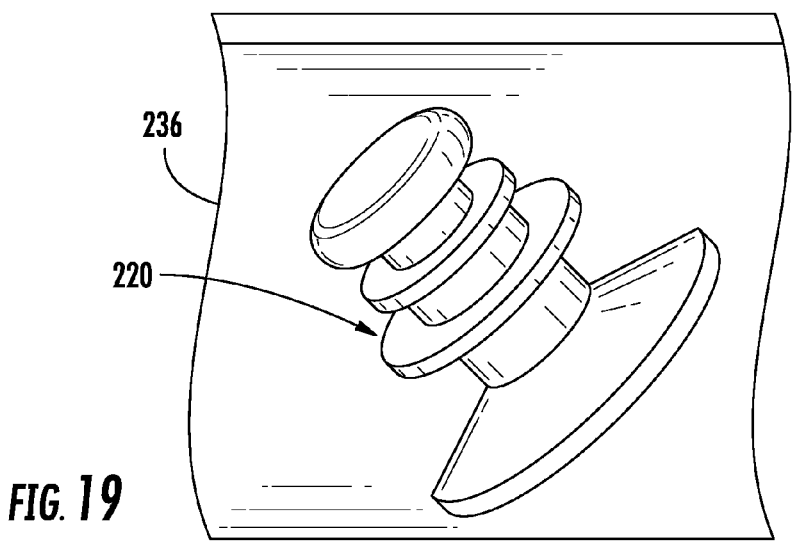
FIG. 19 is a side elevational view of the cap-type aseptic fitment as shown in FIG. 15 positioned within a sterile bag.

The only surface of the cap-style filling fitment 220 that is not sterilized during the container sterilization process or the aseptic filling process is the contact surface 235 (FIG. 15) of the initial overlap region extending along the length L between the cap 222 and the filling fitment body 221. In order to properly sterilize this surface 235, the filling fitment 220 may be sealed in a sealable package 236 (FIG. 19) of suitable material and exposed to gamma radiation. The entire cap-type aseptic filling fitment 220 is then kept clean and sterile until it is ready to be assembled onto the intermodal container 180.

Figure 20:
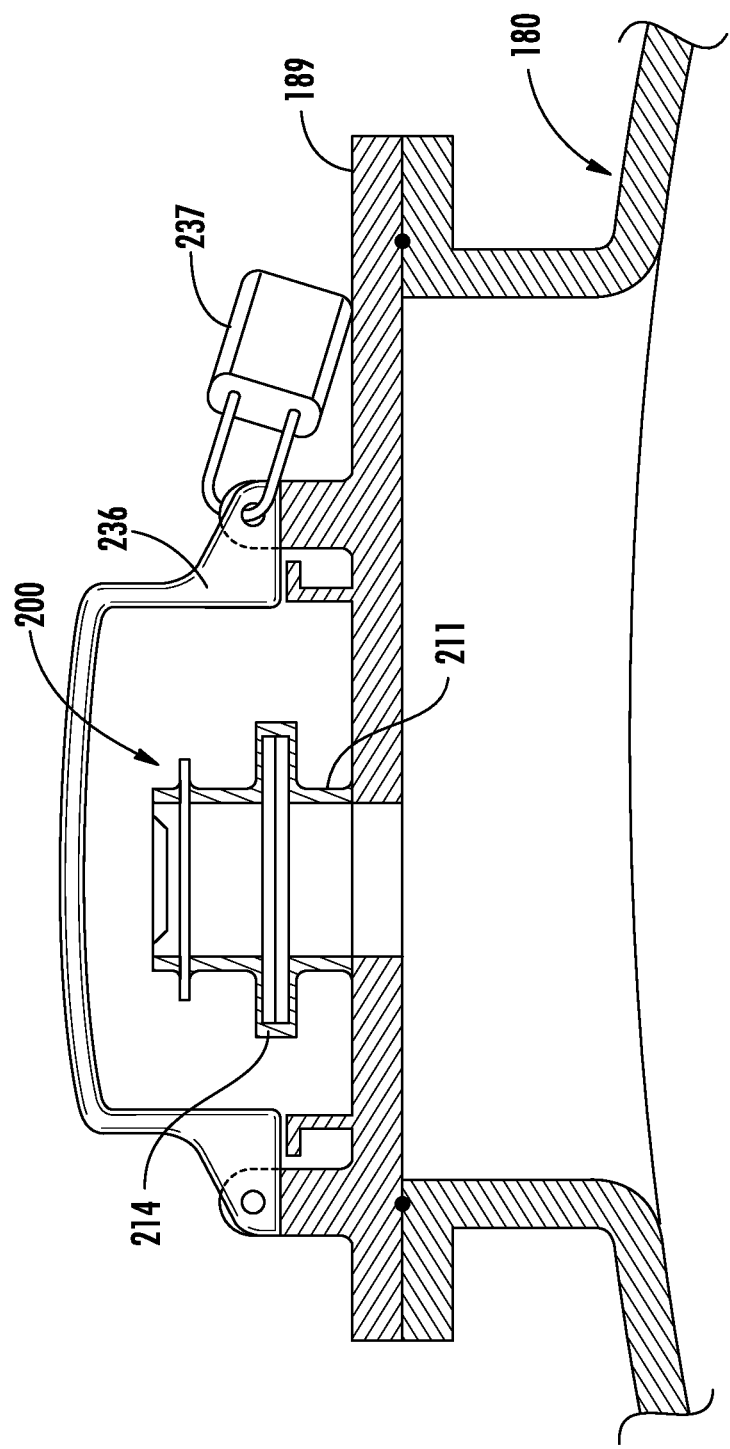
FIG. 20 is a side elevational view, partially in section, of the membrane-type aseptic fitment as shown in FIG. 10 and installed on an intermodal container.

After filling and sealing either of the aseptic fitments 200, 220 a hinged protective cover 236 may be positioned over the fitment to protect the fitment during transportation, as shown in FIG. 20. The hinged cover 236 may be lockable to the container via the illustrated lock 237 or may be sealed with a tamper resistant seal to avoid tampering during transportation.

In addition, other features relating to the area of aseptically handling food products are disclosed in the copending patent application filed concurrently herewith and assigned to the assignee of the present invention and is entitled METHOD AND APPARATUS FOR HANDLING STERILIZED FOOD PRODUCT, Ser. No. 12/941,135, the entire disclosure of which is incorporated herein in its entirety by reference. Many modifications and other embodiments of the invention will come to the mind of one skilled in the art having the benefit of the teachings presented in the foregoing descriptions and the associated drawings. For example, the methods and structures disclosed herein for intermodal containers could also be applied to over-the-road tankers, and/or railcars as will be appreciated by those skilled in the art. Therefore, it is understood that the invention is not to be limited to the specific embodiments disclosed, and that modifications and embodiments are intended to be included within the scope of the appended claims.

That which is claimed is:

1. A method for handling a sterilized food product comprising:
    securing a cap-type aseptic fitment to a filling port of an intermodal container comprising a rigid shell having an elongate shape with opposed closed ends, and at least one frame assembly supporting the rigid shell, said rigid shell also having a discharge port therein;
    closing the discharge port;
    sterilizing the intermodal container;
    maintaining the intermodal container in a fixed position while aligning a cap-type compatible moveable aseptic filling head by moving the cap-type compatible moveable aseptic filling head in at least an x-y plane relative to the intermodal container; and
    aseptically filling the sterilized intermodal container with the sterilized food product through the cap-type compatible moveable aseptic filling head and the cap-type aseptic fitment.

2. The method according to claim 1 further comprising sealing the cap-type aseptic fitment after aseptic filling.

3. The method according to claim 1 further comprising aligning the cap-type compatible moveable aseptic filling head based upon at least one of optical, mechanical and electrical sensing.

4. The method according to claim 1 further comprising supplying a sterile gas to maintain a positive pressure within the intermodal container during aseptic filling.

5. The method according to claim 1 wherein the sterilized food product comprises a viscous sterilized food product having an absolute viscosity of greater than 500 centipoise.

6. The method according to claim 1 wherein the sterilized food product comprises sterilized citrus pulp.

7. The method according to claim 1 wherein the sterilized food product comprises sterilized fruit or vegetable juice.

8. The method according to claim 1 wherein the intermodal container has a capacity greater than 10,000 liters.

9. The method according to claim 1 further comprising transporting the intermodal container after aseptic filling and subsequently discharging the sterilized food product by opening the discharge port.

10. The method according to claim 9 further comprising maintaining at least one of a desired pressure and desired temperature within the intermodal container during transporting.

11. The method according to claim 10 further comprising recording at least one of the desired pressure and desired temperature.

12. The method according to claim 10 further comprising wireless transmitting at least one of the desired pressure and desired temperature.

13. The method according to claim 1 wherein sterilizing comprises sterilizing using at least one of steam and a chemical sterilant.

14. A method for handling a sterilized food product comprising:
    securing a cap-type aseptic fitment to a filling port of an intermodal container comprising a rigid shell having an elongate shape with opposed closed ends, said rigid shell also having a discharge port therein, and at least one frame assembly supporting the rigid shell for transporting in a generally horizontal orientation via at least one of rail, truck, and ship;
    closing the discharge port;
    sterilizing the intermodal container;
    maintaining the intermodal container in a fixed position while aligning a cap-type compatible moveable aseptic filling head by moving the cap-type compatible moveable aseptic filling head in at least an x-y plane relative to the intermodal container;
    aseptically filling the sterilized intermodal container with the sterilized food product through the cap-type aseptic fitment and using the cap-type compatible moveable aseptic filling head; and
    sealing the intermodal container after aseptic filling.

15. The method according to claim 14 further comprising aligning the cap-type compatible moveable aseptic filling head based upon at least one of optical, mechanical and electrical sensing.

16. The method according to claim 14 further comprising supplying a sterile gas to maintain a positive pressure within the intermodal container during aseptic filling.

17. The method according to claim 14 wherein the intermodal container has a capacity greater than 10,000 liters.

18. The method according to claim 14 further comprising transporting the intermodal container after aseptic filling and subsequently discharging the sterilized food product by opening the discharge port.

* * * * *